United States Patent
Stone et al.

(10) Patent No.: US 7,293,816 B2
(45) Date of Patent: Nov. 13, 2007

(54) STRUCTURAL RAIL SYSTEM FOR SUPPORTING AN OVERHEAD CONSOLE

(75) Inventors: Jay Stone, Troy, MI (US); Mark Niedzwiecki, Troy, MI (US); John M. Tiesler, Harrison Township, MI (US); Matthew J. Brown, Rochester Hills, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 113 days.

(21) Appl. No.: 10/907,907

(22) Filed: Apr. 20, 2005

(65) Prior Publication Data

US 2006/0237984 A1  Oct. 26, 2006

(51) Int. Cl.
*B60R 13/01* (2006.01)
*B60R 7/04* (2006.01)

(52) U.S. Cl. .............. 296/37.7; 296/24.34; 296/37.8; 296/210; 296/214; 224/311

(58) Field of Classification Search ............ 296/214, 296/37.1, 37.8, 37.7, 210, 24.34; 224/311, 224/328, 281, 214, 552, 555
See application file for complete search history.

(56) References Cited

U.S. PATENT DOCUMENTS

| | | | | |
|---|---|---|---|---|
| 4,818,010 | A | * | 4/1989 | Dillon ................... 296/37.7 |
| 4,867,498 | A | * | 9/1989 | Delphia et al. ......... 296/37.7 |
| 5,094,316 | A | | 3/1992 | Rosen |
| 5,398,856 | A | * | 3/1995 | Shyu ..................... 224/277 |
| 5,575,500 | A | | 11/1996 | Mimura et al. |
| 5,605,353 | A | | 2/1997 | Moss et al. |
| 5,725,271 | A | | 3/1998 | Patel et al. |
| 5,775,762 | A | * | 7/1998 | Vitito .................... 296/37.7 |
| 5,820,204 | A | | 10/1998 | Masuda et al. |
| 5,927,784 | A | * | 7/1999 | Vitito .................... 296/37.7 |
| 5,988,678 | A | | 11/1999 | Nakamura et al. |
| 6,024,262 | A | * | 2/2000 | Duncan ................. 224/311 |
| 6,092,704 | A | * | 7/2000 | Baumeister ............ 224/275 |
| 6,115,086 | A | * | 9/2000 | Rosen ................... 348/837 |
| 6,145,908 | A | | 11/2000 | Deb et al. |
| 6,168,204 | B1 | | 1/2001 | Beckman |
| 6,173,990 | B1 | | 1/2001 | Nakajima et al. |
| 6,189,930 | B1 | | 2/2001 | Kalazny |
| 6,338,517 | B1 | * | 1/2002 | Canni et al. ............ 296/37.8 |

(Continued)

FOREIGN PATENT DOCUMENTS

JP  60226338 A  11/1985

(Continued)

OTHER PUBLICATIONS

Search Report under Section 17, Application No. GB0607423.1, Jul. 18, 2006.

*Primary Examiner*—Dennis H. Pedder
*Assistant Examiner*—Greg Blankenship
(74) *Attorney, Agent, or Firm*—Brooks Kushman P.C.

(57) ABSTRACT

A structural rail system 10 for supporting an overhead console 12 in relation to a roof bow 13 within a vehicle. A pair of rail members 14, 16 are spaced apart and extend longitudinally. One or more brackets 18, 20, 22, 24 are oriented laterally in relation to the pair of rail members 14, 16. Accessories 26 are attached to the brackets 18, 20, 22, 24 and are housed within the console 12.

13 Claims, 3 Drawing Sheets

U.S. PATENT DOCUMENTS

| | | | |
|---|---|---|---|
| 6,339,455 B1 * | 1/2002 | Allan et al. | 348/837 |
| 6,416,027 B1 * | 7/2002 | Hart | 248/324 |
| 6,669,260 B2 * | 12/2003 | Clark et al. | 296/37.8 |
| 6,685,257 B1 | 2/2004 | Beland et al. | |
| 6,749,244 B1 * | 6/2004 | Song | 296/37.7 |
| 6,824,185 B2 * | 11/2004 | Tiesler et al. | 296/37.8 |
| 6,827,384 B2 * | 12/2004 | Anderson et al. | 296/37.8 |
| 6,926,333 B2 * | 8/2005 | Sturt | 296/37.8 |
| 6,957,839 B1 * | 10/2005 | Tiesler et al. | 296/24.34 |
| 6,971,699 B2 * | 12/2005 | Isaacson | 296/37.8 |
| 7,055,882 B2 * | 6/2006 | Santaolalla Gil et al. | 296/37.7 |
| 7,097,225 B2 * | 8/2006 | Huisingh et al. | 296/37.7 |
| 2002/0163219 A1 * | 11/2002 | Clark et al. | 296/37.8 |
| 2003/0168875 A1 * | 9/2003 | Anderson et al. | 296/37.8 |
| 2004/0084920 A1 * | 5/2004 | Trimble et al. | 296/37.8 |
| 2004/0160087 A1 * | 8/2004 | Tiesler | 296/193.04 |
| 2004/0256875 A1 * | 12/2004 | McCauley | 296/37.7 |

FOREIGN PATENT DOCUMENTS

| | | |
|---|---|---|
| JP | 61081839 A | 4/1986 |
| WO | WO 2004/020249 A3 | 11/2004 |
| WO | WO 2005/061278 A3 | 7/2005 |

* cited by examiner

STRUCTURAL RAIL SYSTEM FOR SUPPORTING AN OVERHEAD CONSOLE

BACKGROUND OF THE INVENTION

1. Field of the Invention

The invention relates to in-vehicle structural systems for supporting an overhead console and accessories that are attached thereto.

2. Background Art

The accommodation of in-vehicle accessories has presented spatial challenges to the engineer. Traditionally, overhead consoles have been developed so they can be applied to sheet metal on the underside of a vehicle roof. Conventionally, accessories such as DVD players, storage bins, and HVAC controls are housed by the overhead console. But such approaches have led to incursions into the overhead space that is available in the passenger compartment or cargo storage compartment of the vehicle.

Traditional methods for attaching the console to the vehicle roof or the accessory to the console have involved screws or welding. Those attachment methods and associated structures have been known to be accompanied by a shake or shudder in an image projected by a DVD screen when viewed through the eye of a vehicle occupant. Further, conventional attachment methods may result in unwanted rattles, squeaks, and other noise.

One prior art reference is U.S. Pat. No. 6,685,257 entitled "EXTRUSION FOR THE SIDERAIL OF A VEHICLE TO PROVIDE HEAD IMPACT COUNTERMEASURE AND SUPPORT FOR SIDE RAIL COMPONENTS". That patent discloses a platform for the slidable attachment of such items as grab handles, coat hooks, visor tracks, etc. before they are locked into place. The hollow interior of the structure can be used to house additional safety components, such as a side air bag. Other art considered in preparing this patent application includes the following U.S. Pat. Nos. 6,189,930; 6,173,990; 6,168,204; 6,145,908; 5,988,678; 5,820,204; 5,725,271; 5,605,353; and 5,575,500.

SUMMARY OF THE INVENTION

In light of such conventional approaches, it would be desirable to provide structural support to an overhead console and associated accessories so that there is minimal incursion into the space (headroom) between a vehicle occupant's head and the console.

Additionally, it would be desirable to provide structural support so that related problems of noise, vibration, or harshness are minimized or avoided.

Accordingly, there is need to provide an acceptable positioning mechanism for and to facilitate the installation of sundry accessories that require compatibility with an overhead console. Such items include without limitation DVD systems, advanced lighting systems, navigation systems, and ports for TV's and computers. Preferably, these features should be installed when the overhead system is pre-assembled. Frequently, it has in the past been necessary to install such items at the OEM assembly plant. But such assembly can be costly and be time consuming.

The invention includes a structural rail system for supporting an overhead console and associated accessories in relation to a vehicle roof. To provide a reference framework, the vehicle is considered to have an imaginary longitudinal and lateral axis. The terms "right" and "left" are used in relation to a forward direction of the vehicle.

The structural rail system has a pair of rail members that are spaced apart. They extend substantially in a longitudinal direction. One or more brackets are oriented substantially laterally across the pair of rails. Accessories (such as DVD's, storage compartments, lighting systems, audio controls and HVAC control modules) are attached to one or more of the lateral brackets or longitudinal rail members (collectively "rail system").

The overhead console has an interior region within which the accessories are positioned and secured to the rails or brackets, thus allowing the rails or brackets to be at the same vertical level or up/down height as the console. In this way, incursion into the head room between the head of a vehicle occupant and the vehicle headliner is substantially avoided.

These and other features of the invention are achieved individually or collectively as described in the following detailed description when taken in combination with the Figures.

DETAILED DESCRIPTION OF THE PREFERRED EMBODIMENT(S)

Figure 1:
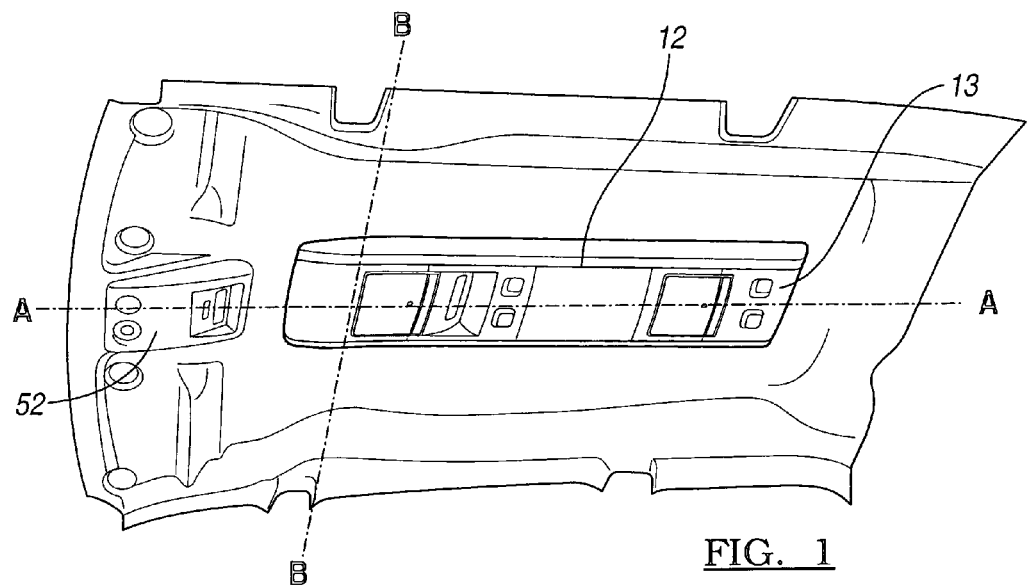
FIG. 1 is perspective view depicting an environment in which the invention is used. It illustrates an overhead console secured in position by the invention (not shown) in relation to the underside of a vehicle roof.

FIG. 1 is helpful in referencing an environment in which the invention is used. Depicted therein is an overhead console 12 that is secured by a structural rail system 10 (FIGS. 2-4) in relation to a roof bow 13 (FIG. 4) within a vehicle. Conventionally, the vehicle can be considered to have an imaginary longitudinal axis (A-A) and a lateral axis (B-B).

Figure 2:
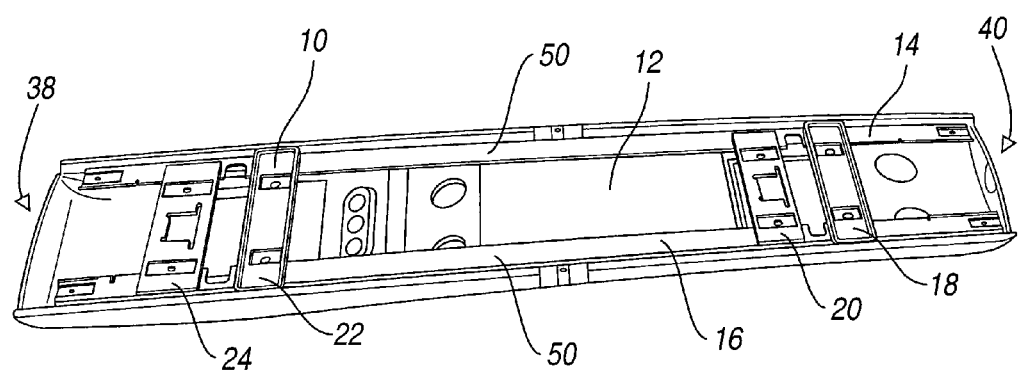
FIG. 2 is an isometric view of a structural rail system that supports the overhead console.
Figure 3:
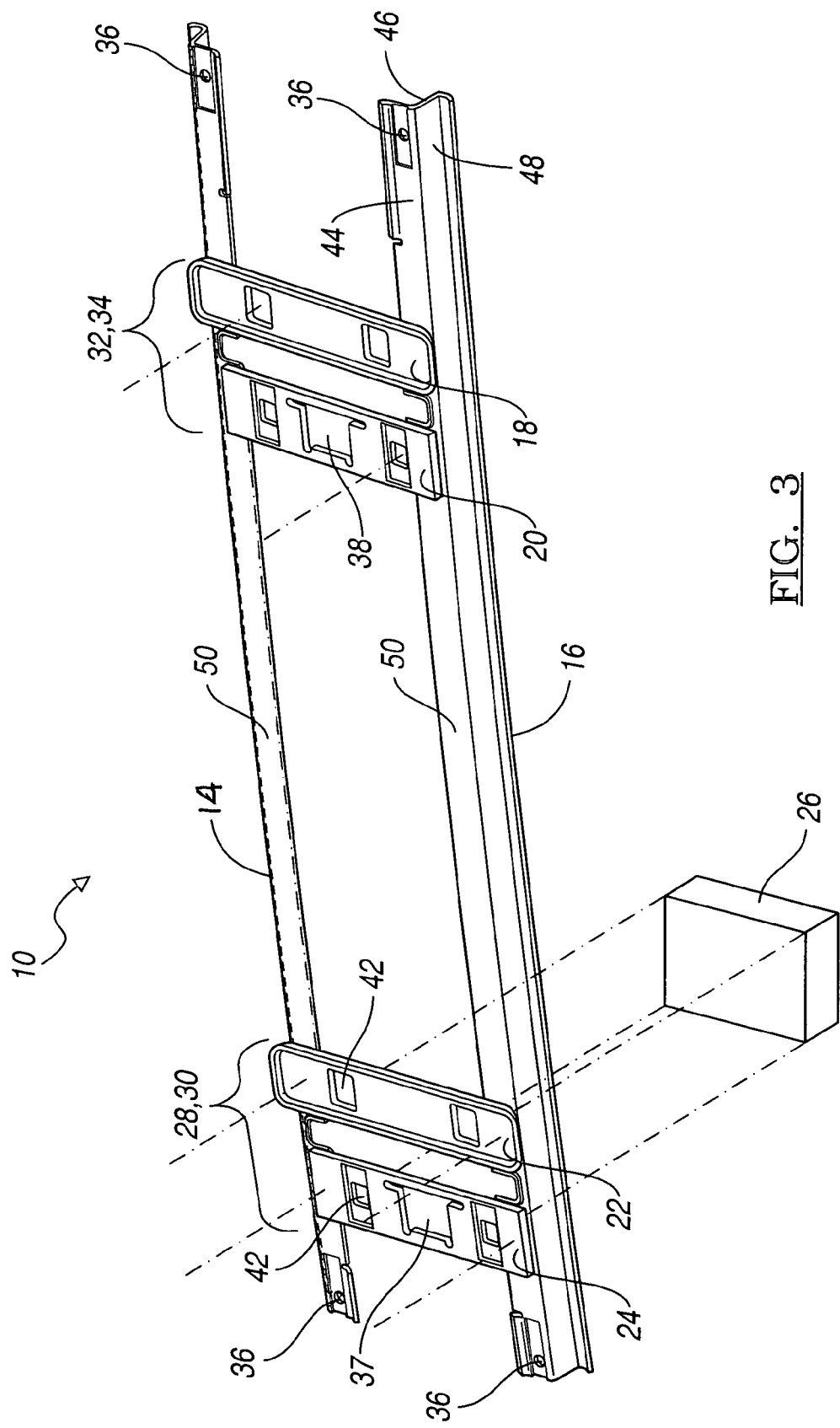
FIG. 3 is an isometric view of the structural rail system according to the present invention without attachment to the vehicle roof or to the overhead console. Also depicted schematically is an accessory that is attached to the rail system.

As depicted in FIGS. 2-3, the structural rail system 10 includes a pair of rail members 14, 16 that are spaced apart and extend substantially in a longitudinal direction. It will be appreciated that deviations from a parallel relationship should be considered within the scope of the invention. Further, the rail members may be spaced more closely in a forward region 39 or a rearward region 40, or vice versa.

Extending laterally across the pair of rail members 14, 16 are one or more brackets 18, 20, 22, 24. Although depicted in FIGS. 2 and 3 as 4 brackets bearing the reference numerals 18, 20, 22, 24, it should be realized that the depicted embodiment is exemplary only. In practice, for example, the brackets 18, 20 would be combined into a unitary bracket. Similarly for the brackets 22, 24.

When vehicle accessories such as a DVD 26 (FIGS. 3-4) are attached to the brackets or rail members, there is minimal buzz, rattle or vibration therebetween. Such characteristics are important where the accessory is a DVD because its image should be viewed by the vehicle occupant without significant shaking or vibration.

To attach the pair of rail members 14, 16 to the vehicle roof bow 13, means for securing 36 (FIG. 3) are provided. The securing means include for example, screws, nuts, rivets, heat staked plastic members, clips, and the like.

As illustrated in FIGS. 2 and 3, holes such as openings 37, 38 can be provided to the brackets or rail members to reduce weight and material costs.

As best shown in FIG. 3, the means for securing 36—or holes comprise four such means. Preferably, the means for securing 36 are positioned proximate the forward and rear regions 38, 40 of the pair 14, 16 of rail members.

At least one of the brackets 18, 20, 22, 24 is provided with means 42 for attaching accessories 26 to the one or more brackets. Again, the means for attaching may be embodied, for example, in screws, nuts, bolts, rivets, heat staked plastic members, clips and the like.

Figure 4:
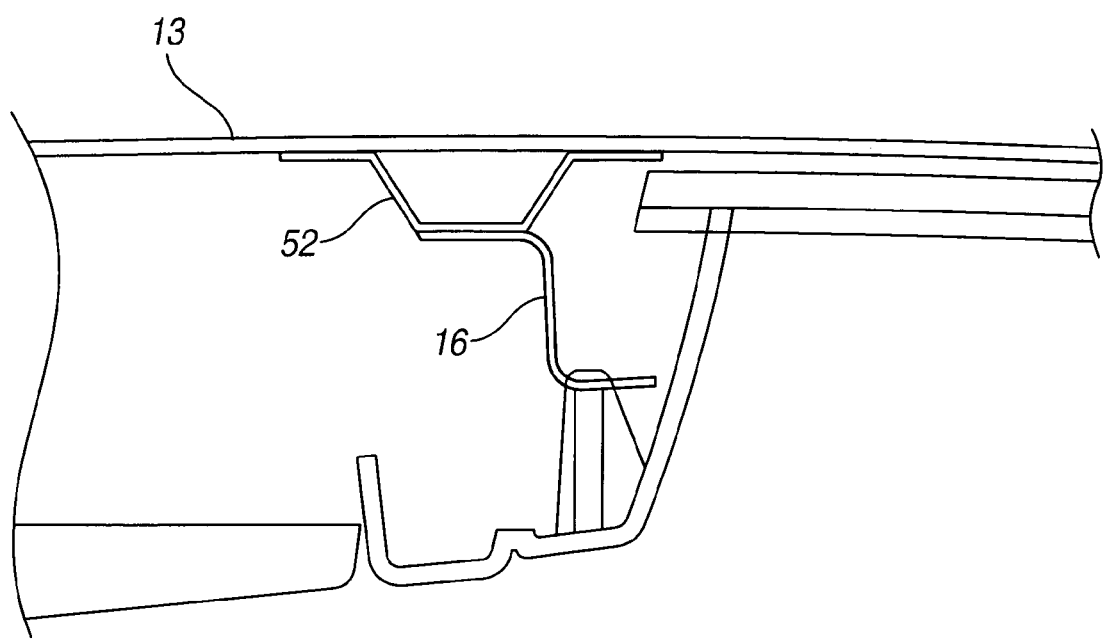
FIG. 4 is a cross-section of the right hand half of the assembly which illustrates how the invention minimizes incursion into the head room between the passenger's head and the vehicle roof.

Turning now to FIGS. 3-4, at least one of the pair of rail members 14, 16 comprises a flange 44 that is affixed by a security means 36 to the vehicle roof bow 13. Extending downwardly from the flange 44 is a riser portion 46 and a bottom section 48. As depicted in FIG. 3, the one or more brackets are attached to the flange 44. The flange 44 engages the vehicle roof bow 13.

The bottom flange 48 is used as a bearing surface to which is attached the overhead console 12. Attachment can be in the form of screws, bolts, heat stakes, clips and the like.

To enable the disclosed structural rail system 10 to conform with a domed contour of the vehicle roof bow 13, the pair of rail members 14, 16 can be provided with curved sections 50 (FIG. 2) that are curved in a longitudinal direction. If desired, the curved sections 50 may also be contoured such that they have a flange 44 that is shaped in a direction that lies parallel to the lateral axis B-B of the vehicle.

Finite element analyses (FEA) have been conducted on the overhead console when it supports a DVD assembly in order to evaluate dynamic response. A 900 Newton load was vertically applied to a rigid fixture and then to the assembly as installed in a vehicle. In the FEA testing environment, the maximum plastic strains in any iteration were observed to be very small compared to failure strains. The loads imposed were below the yield point.

One way of practicing the present invention is to assemble the accessories and console following these process steps:

1. attach a DVD screen via four fasteners to a pre-assembled structural rail system (also termed a "ladder bracket")—preferably, the bracket supplier pre-assembles the ladder bracket;
2. place the DVD and ladder bracket subassembly into a console bezel subassembly and secure it with fasteners (e.g. six) per side;
3. install (if desired) a mood lighting pipe;
4. route a harness and make all wire connections;
5. perform a functional check; and
6. label, pack and ship.

To configure the console bezel subassembly:

1. place the console bezel into a nest with the A side facing upwardly;
2. install a pre-assembled HVAC/LED trim plate via clips;
3. install a pre-assembled rear trim plate with LED via clips;
4. install pivot posts for middle storage bins (four total);
5. install a latch and damper for the middle storage bin; and
6. install the pre-assembled middle storage bins.

If desired based on roof bow height, a spacer 52 bar (FIG. 4) can be installed between the flange 44 and the vehicle roof bow 13. When the spacer 52 bar is deployed (FIG. 4) additional clearance is provided between the pair of rail members 14, 16 and the vehicle roof 13.

Preferably, the overhead console 12 is provided with a concave interior region within which at least some of the accessories 26 are positioned. When the structural rail system 10 is installed within the console 12 for attachment to the vehicle roof bow 13, longitudinally extending edges of the console 12 extend over the riser portion 46 and bottom section 48 of the pair of rail members 14.

It should be noted that the term "overhead console" as used herein and as depicted in FIGS. 1-2 should be construed to mean not only the console that is positioned as shown in FIG. 1, but also the possibility of a forwardly located console such as that depicted in FIG. 1 by the reference numeral 52. Relatedly, the term "console" may also refer to roof-mounted structures that are located aft of the overhead console 12 depicted in FIG. 1.

It can be appreciated that the specific materials from which the disclosed invention is made can be selected from a wide range, depending upon the particular application. Generally, metals and metal alloys can be used. Plastic can also be used if it exhibits certain deformation characteristics.

Thus, the invention provides a system for providing structural support to an overhead console in which various accessories may be installed if firm support is required without excessive bulk or incursion into the available head room. The structural rail system is located inside a console bezel. It is below the "A" or cloth surface of the headliner.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A structural rail system for supporting an overhead console in relation to a roof within a vehicle having longitudinal and a lateral axis, the structural rail system comprising:
   a pair of rail members that are spaced apart and extend substantially in a longitudinal direction, at least one of the pair of rail members having a Z-shaped section including a flange that is affixed to the vehicle roof, a planar riser portion that extends from the flange, and a bottom section that is attachable to the console; and
   one or more brackets that are oriented substantially laterally across the pair of rail members, the one or more brackets supporting accessories that are operable from within the vehicle interior, the accessories being secured with minimal buzz, rattle or vibration between the accessories, the structural rail system, and the vehicle roof.

2. The structural rail system of claim 1, wherein the one or more brackets comprise one or more forward brackets and one or more rearward brackets.

3. The structural rail system of claim 1, wherein the pair of rail members include means for securing the pair of rail members to the roof within the vehicle.

4. The structural rail system of claim 2, wherein an opening is provided in at least one of the forward and rear brackets, the opening being positioned between the pair of rail members.

5. The structural rail system of claim 3, wherein the means for securing comprise at least four means for securing.

6. The structural rail system of claim 5, wherein the means for securing include at least two such means that are positioned proximate a forward region and at least two such means positioned proximate a rear region of the pair of rail members.

7. The structural rail system of claim 1, wherein at least one of the one or more brackets is provided with means for attaching accessories to the one or more brackets.

8. The structural rail system of claim 1, wherein the pair of rail members include curved sections that are curved in a longitudinal direction for conformance with the roof of the vehicle.

9. A structural rail system for supporting an overhead console in relation to a roof bow within a vehicle having a longitudinal and a lateral axis, the structural rail system comprising:
   a pair of rail members that are spaced apart and extend substantially in a longitudinal direction at least one of the pair of rail members having a Z-shaped section including a flange that is affixed to the vehicle roof, a planar riser portion that extends from the flange, and a bottom section that is attachable to the console;
   one or more brackets that are oriented substantially laterally across the pair of rails; and
   one or more accessories that are attached via the one or more brackets so that there is minimal buzz, rattle or vibration between accessories and the structural rail system.

10. The structural rail system of claim 9, wherein the one or more accessories include a DVD player.

11. A structural rail system within a vehicle, the rail system comprising:
   a pair of rail members that are spaced apart and extend substantially in a longitudinal direction at least one of the pair of rail members having a Z-shaped section including a flange that is affixed to the vehicle roof, a planar riser portion that extends from the flange, and a bottom section that is attachable to the console;
   one or more brackets that are oriented substantially laterally across the pair of rails;
   an overhead console secured to the one or more brackets; and
   a plurality of accessories that are attached to the overhead console so that there is minimal buzz, rattle or vibration between the accessories and the vehicle.

12. The structural rail system of claim 11, wherein the overhead console has a concave interior region within which at least some of the accessories are positioned before the console is secured to the one or more brackets, so that incursion into the headroom between the head of a vehicle occupant and the vehicle roof is minimized.

13. The structural rail system of claim 12, further including one or more spacers interposed between the vehicle roof and the pair of rail members.

* * * * *